US012764514B2

(12) United States Patent
Nayak et al.

(10) Patent No.: US 12,764,514 B2
(45) Date of Patent: Oct. 13, 2026

(54) METHODS AND SYSTEMS FOR MANAGING UNCREWED AERIAL SYSTEMS (UAS) IN 3GPP

(71) Applicant: Samsung Electronics Co., Ltd., Gyeonggi-do (KR)

(72) Inventors: Ashok Kumar Nayak, Bangalore (IN); Dongyeon Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 215 days.

(21) Appl. No.: 18/293,601

(22) PCT Filed: Aug. 9, 2022

(86) PCT No.: PCT/KR2022/011859

§ 371 (c)(1),
(2) Date: Jan. 30, 2024

(87) PCT Pub. No.: WO2023/018181

PCT Pub. Date: Feb. 16, 2023

(65) Prior Publication Data

US 2024/0349026 A1 Oct. 17, 2024

(30) Foreign Application Priority Data

Aug. 12, 2021 (IN) ............................. 202141036581
Jun. 7, 2022 (IN) ............................. 202141036581

(51) Int. Cl.

*H04W 8/00* (2009.01)
*H04B 7/185* (2006.01)
*H04L 67/51* (2022.01)

(52) U.S. Cl.

CPC ............ *H04W 8/005* (2013.01); *H04L 67/51* (2022.05); *H04B 7/18513* (2013.01)

(58) Field of Classification Search

CPC ..... H04W 8/005; H04L 67/51; H04B 7/18513
See application file for complete search history.

(56) References Cited

U.S. PATENT DOCUMENTS

2020/0127916 A1 4/2020 Krishan
2021/0067480 A1 3/2021 Goel (Continued)

FOREIGN PATENT DOCUMENTS

WO WO 2020/141356 7/2020
WO WO 2020/263486 12/2020

OTHER PUBLICATIONS

PCT/ISA/210 Search Report dated Nov. 7, 2022, issued on PCT/KR2022/011859, pp. 3.

(Continued)

*Primary Examiner* — Mohammad S Anwar

(74) *Attorney, Agent, or Firm* — The Farrell Law Firm, P.C.

(57) ABSTRACT

The disclosure relates to a 5G or 6G communication system for supporting a higher data transmission rate. Embodiments herein disclose systems and methods for ensuring that a Network Function (NF) supporting correct Uncrewed Aerial System Network Function (UAS NF) functionality is selected by an Access and Mobility Management Function (AMF) and/or Session Management Function during authentication and authorization of Uncrewed Aerial Vehicle (UAV).

15 Claims, 6 Drawing Sheets

(56) References Cited

U.S. PATENT DOCUMENTS

| | | | | |
|---|---|---|---|---|
| 2021/0235254 | A1 | 7/2021 | Farooq | |
| 2023/0232204 | A1 * | 7/2023 | Ryu | H04W 8/18 370/329 |

OTHER PUBLICATIONS

PCT/ISA/237 Written Opinion dated Nov. 7, 2022, issued on PCT/KR2022/011859, pp. 4.
3GPP TS 23.256 V1.0.0 (Jun. 2021), pp. 39.
Indian Examination Report dated Jun. 14, 2024 issued in counterpart application No. 202141036581, 6 pages.
Indian Hearing Notice dated Jun. 25, 2026 issued in counterpart application No. 202141036581, 2 pages.

* cited by examiner

[Fig. 5]
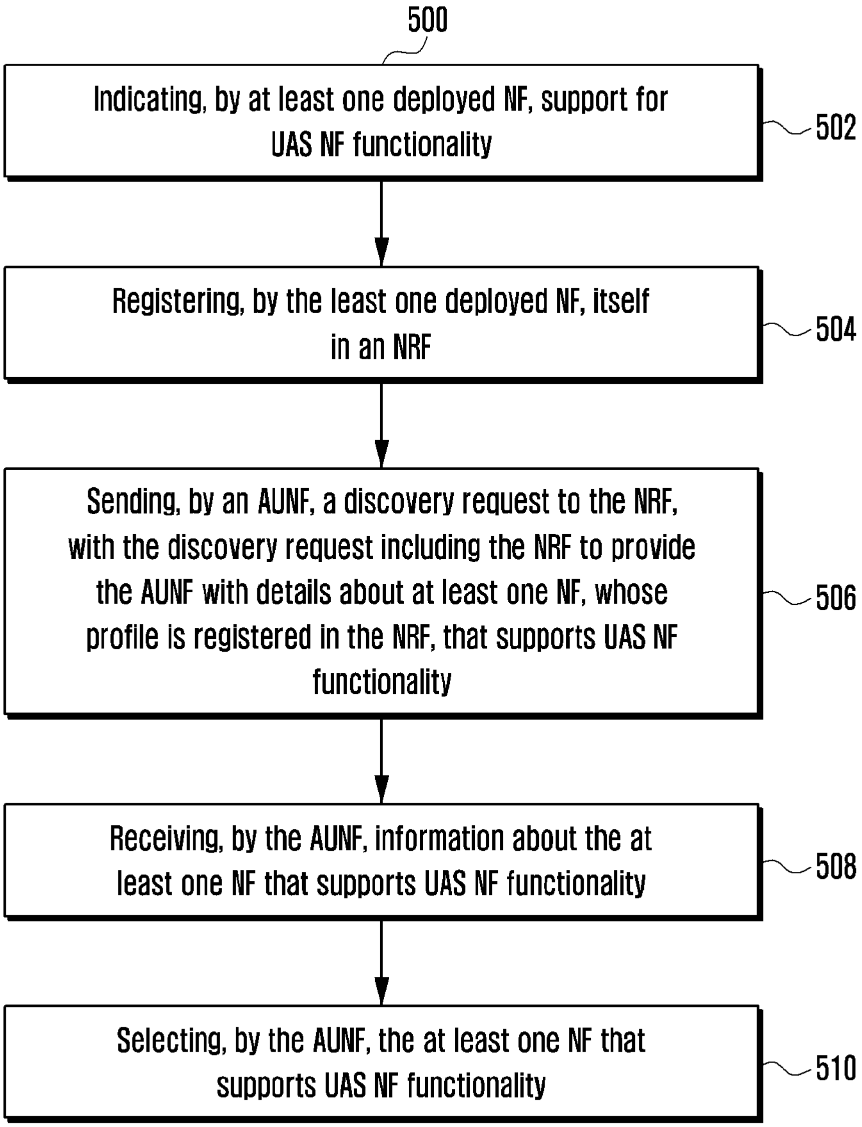

[Fig. 6]
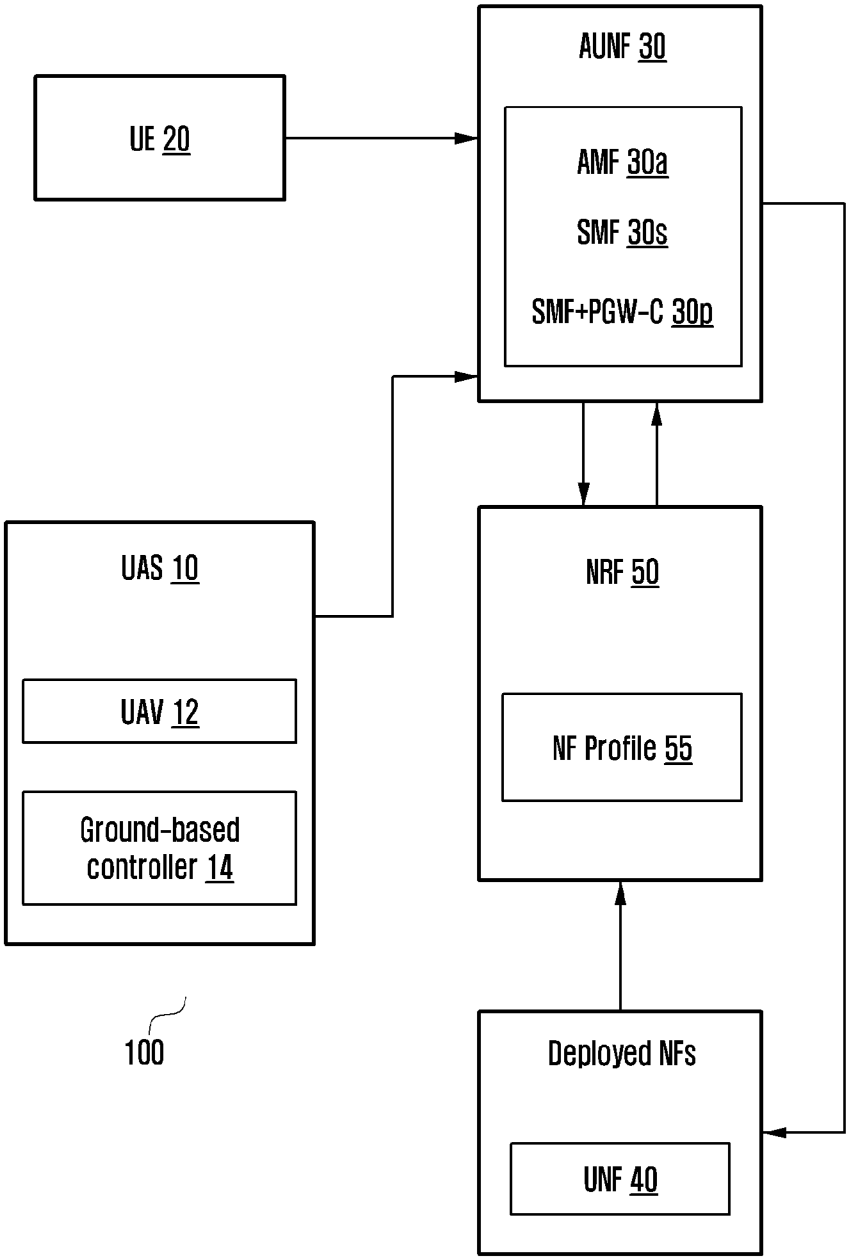

METHODS AND SYSTEMS FOR MANAGING UNCREWED AERIAL SYSTEMS (UAS) IN 3GPP

PRIORITY

This application is a National Phase Entry of PCT International Application No. PCT/KR2022/011859, which was filed on Aug. 9, 2022, and claims priority to Indian patents application Ser. Nos. 20/214,1036581 and 202141036581, which were filed on Aug. 12, 2021, and Jun. 7, 2022, respectively, the entire content of each of which is incorporated herein by reference.

TECHNICAL FIELD

Embodiments disclosed herein relates to Unmanned Aircraft Systems (UAS), and more particularly to correctly selecting, by a consumer Network Function (NF), a producer NF that supports UAS NF functionality.

BACKGROUND ART 5G mobile communication technologies define broad frequency bands such that high transmission rates and new services are possible, and can be implemented not only in "Sub 6 GHZ" bands such as 3.5 GHZ, but also in "Above 6 GHZ" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

An unmanned aerial vehicle (UAV), commonly known as a drone, is an aircraft without any human pilot, crew or passengers on board. UAVs can be a component of an unmanned aircraft system (UAS), which can further include a ground-based controller and a system of communications with the UAV. The flight of UAVs may operate under remote control by a human operator, as a remotely-piloted aircraft (RPA), or with various degrees of autonomy, such as from autopilot assistance, up to fully autonomous aircraft that have no provision for human intervention.

UAVs were originally developed through the twentieth century for completing military missions that were not suitable to be performed by humans, as those missions could be considered as dull, dirty, or even dangerous.

Based on the studies conducted by the 3rd Generation Partnership Project (3GPP) on UAVs, as part of the technical specification (TS) 23.256, the UAVs may be authenticated and authorized during a registration, a protocol data unit (PDU) session, or a packet data network (PDN) connection in evolved packet core (EPC) based on the operator policy by a UAS Service Supplier (USS)/Uncrewed Aerial System Traffic Management (UTM).

As these USS and UTM are not part of the 3GPP NFs and may belong to a third party, for security purposes, all the communication between the UAV and the USS/UTM may happen through the Network Exposure Function (NEF).

The UAS NF may be supported by the NEF and may be used for external exposure of services to the USS. The UAS NF can make use of existing NEF/service capability exposure function (SCEF) exposure services for UAV authentication/authorization, for UAV flight authorization, for UAV-UAVC pairing authorization, and related revocation; for location reporting, and control of QoS/traffic filtering for C2 communication.

A dedicated NEF may be deployed to provide only the UAS NF functionality, i.e., to support the UAS specific features/APIs and the NEF features/APIs that are specified for capability exposure towards the USS.

When a consumer NF, like access and mobility management function (AMF) and/or session management function (SMF), discovers any other producer NF, like UASNF/NEF, it may do so through the help of a network repository function (NRF), as per the existing 3GPP mechanism. However, all the deployed NEF in the network may not support UAS NF functionality, and hence 3GPP has decided that some of the dedicated NEF can play the role of UAS NF. Hence the selection of the correct UAS NF/dedicated NEF for this purpose by the AMF and/or the SMF can play a crucial role.

As outlined in the 3GPP TS 23.256, the AMF can perform the authentication and authorization of the UAV before the UAV is allowed to get the required service or procedure. Similarly, the SMF/SMF+PGW-C (also referred to herein as "a combination of the SMF and packet network data gateway control (PGW-C)") can also perform the authentication and authorization of the UAV during the PDU session establishment (fifth generation core (5GC))/PDN connection request (EPC).

DISCLOSURE OF INVENTION

Technical Problem

The purpose of this application is to be able to solve at least one of the drawbacks of the prior art.

The principal object of the embodiments herein is to disclose systems and methods for ensuring that a Network Function supporting Uncrewed Aerial System Network Function (UAS NF) functionality is selected by a consumer NF during authentication and authorization of Uncrewed Aerial Vehicle (UAV).

Solution to Problem

Accordingly, the embodiments herein provide systems and methods for ensuring that a Network Function supporting Uncrewed Aerial System Network Function (UAS NF) functionality is selected by a consumer NF during authentication and authorization of Uncrewed Aerial Vehicle (UAV). A method by a consumer NF disclosed herein for managing a UAS comprises transmitting, to a NRF, a discovery request that requires the NRF to provide the consumer NF with details about at least one producer NF, among a plurality of producer NFs that supports UAS NF functionality. The method further comprises receiving, from the NRF, information on the at least one producer NF that supports UAS NF functionality. The method further comprises selecting, the at least one producer NF that supports UAS NF functionality. The method further comprises indicating, by at least one producer NF, its support for UAS NF functionality. The method further comprises registering, by at least one producer NF, itself in the NRF, wherein the NRF stores a NF profile that includes information on each registered producer NF.

Accordingly, the embodiments herein provide a system that comprises a plurality of producer NFs, a NRF, and a consumer NF. At least one producer NF among the plurality of producer NFs may support UAS NF functionality. The at least one producer NF may register itself in the NRF, and the NRF may store a NF profile of the at least one producer NF that includes information on the at least one producer NF. The consumer NF may send a discovery request to the NRF, with the discovery request requiring the NRF to provide the consumer NF with details about at least one producer NF that support UAS NF functionality. The consumer NF may receive details about the at least one producer NF that supports UAS NF functionality, select the at least one producer NF that supports UAS NF functionality, and then send at least one data packet to the at least one producer NF that supports UAS NF functionality.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

As described above, the disclosure provides a method and apparatus for consumer NF to discover producer NF supporting UAS NF functionality. Therefore, failure in trying to send the packet to the NEF that does not support UAS NF functionality could be prevented.

BRIEF DESCRIPTION OF DRAWINGS

The embodiments disclosed herein are illustrated in the accompanying drawings, throughout which like reference letters indicate corresponding parts in the various figures. The embodiments herein will be better understood from the following description with reference to the drawings, in which:

FIG. 5 illustrates a method for selecting a NF supporting UAS NF functionality, according to embodiments as disclosed herein; and FIG. 6 illustrates a system that facilitates selection of a NF supporting UAS NF functionality, according to embodiments as disclosed herein.

MODE FOR THE INVENTION

Figure 1:
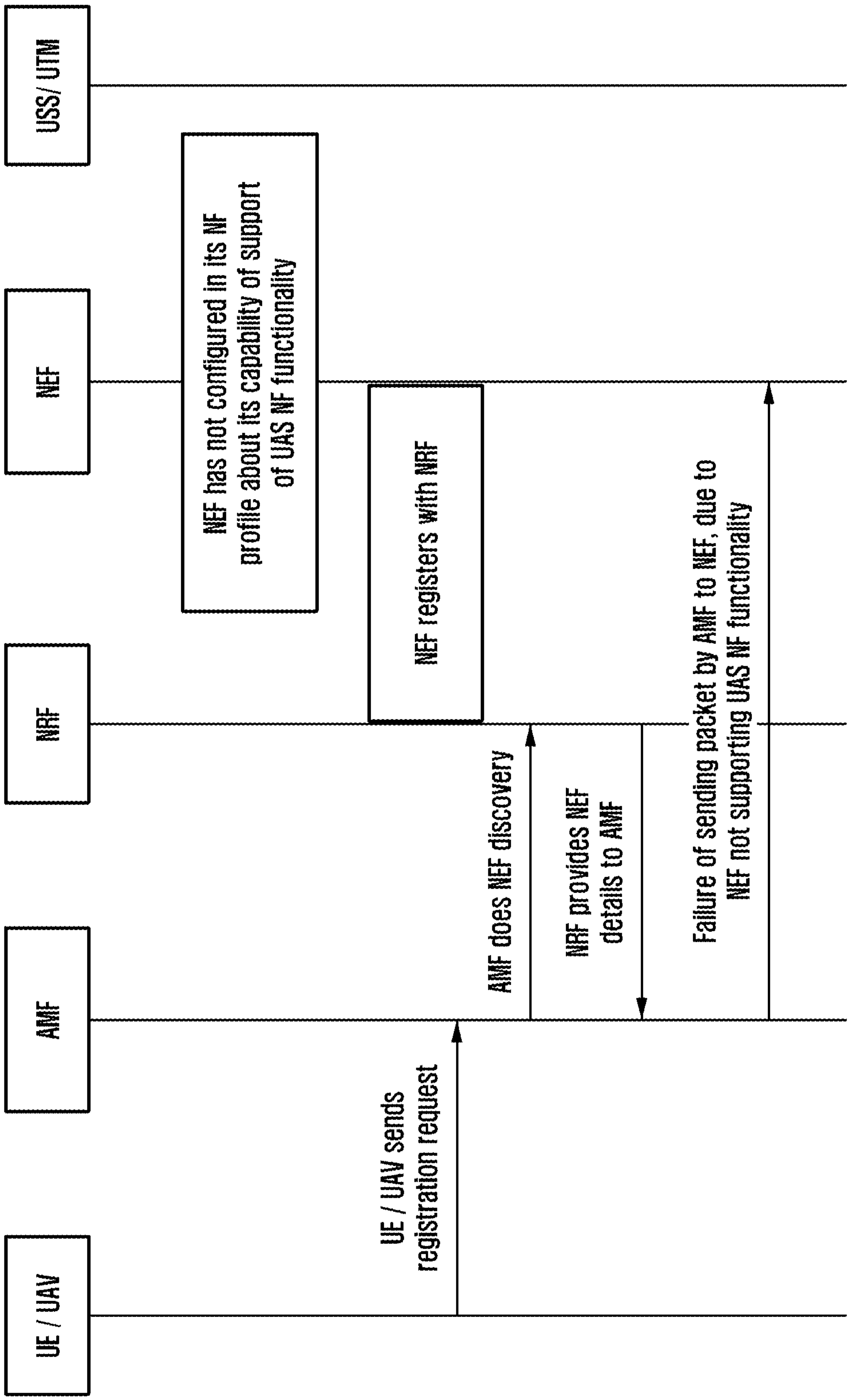
FIG. 1 is a representation of the problem scenario involving selection, by the AMF, of a NEF supporting UAS NF functionality, according to prior art.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve systems and methods for ensuring that a NF that supports Unmanned Aerial System Network Function (UAS NF) functionality is selected by a NF availing the services of UAS NF functionality (a consumer NF), such as the Access and Mobility Management Function (AMF) and/or the Session Management Function during the authentication and the authorization of an Unmanned Aerial Vehicle (UAV). Referring now to the drawings, and more particularly to FIGS. 3 through 6, where similar reference characters denote corresponding features consistently throughout the figures, there are shown at least one embodiment.

It is to be understood that a NF that is providing services is referred to as a "producer NF" and a NF that is availing a provided service is referred to as a "consumer NF." Whether a NF may be regarded as a "producer NF" or a "consumer NF" can vary depending on the context/scenario, as a single NF may be capable of offering a service and availing another service. For clarity, the embodiments disclosed herein may refer to an NF that wishes to avail services of UAS NF functionality as "AUNF 30." An example of the AUNF 30 is AMF 30*a* and SMF/SMF+PGW-C 30*s*. The NF that offers UAS NF functionality may be referred to as "UNF 40." An example of the UNF 40 is a deployed NEF 40*n* that offers UAS NF functionality.

Following are abbreviations used herein:

AMF-Access and Mobility Management Function
UE-User Equipment
SMF-Session Management Function
3GPP-3rd Generation Partnership Project
NEF-Network Exposure Function
NRF-Network Repository Function
UAV-Uncrewed Aerial Vehicle
USS-UAS Service Supplier
UTM-Uncrewed Aerial System Traffic Management
UAS-Uncrewed Aerial Systems Scenario 1 Problem: Selection of UAS NF/NEF by the AMF FIG. 1 illustrates a problem in the scenario where the AMF is required to select a producer NF that supports UAS NF functionality. The network may deploy a plurality of NEFs, among which there may be a few that supports UAS NF functionality. The plurality of NEFs that are deployed, may also be registered within a NRF that stores a profile of the plurality of NEFs. Each NEF may have its own NF profile that stores information on itself. However, the NEFs that are deployed or registered in the NRF, may not indicate in their NF profile about whether they support UAS NF functionality. Upon the UAV sending a registration request to the AMF, the AMF may attempt to discover within the NRF for NEFs that support UAS NF functionality. The NRF may provide the AMF with the details or information on the NEFs in the NRF, however, since the NEFs within the NRF have not indicated in their NF profile about their ability to support UAS NF functionality, there may be a chance that the NRF provides the AMF with details or information on an NEF that does not support UAS NF functionality. Therefore, when the AMF sends a packet to the NEF whose details that the AMF received from the NRF, there may be a failure in sending the packet to the NEF if the NEF does not support UAS NF functionality, which can lead to the UAV's registration request not being completed.

Scenario 2 Problem: Selection of UAS NF/NEF by the SMF/SMF+PGW-C

Figure 2:
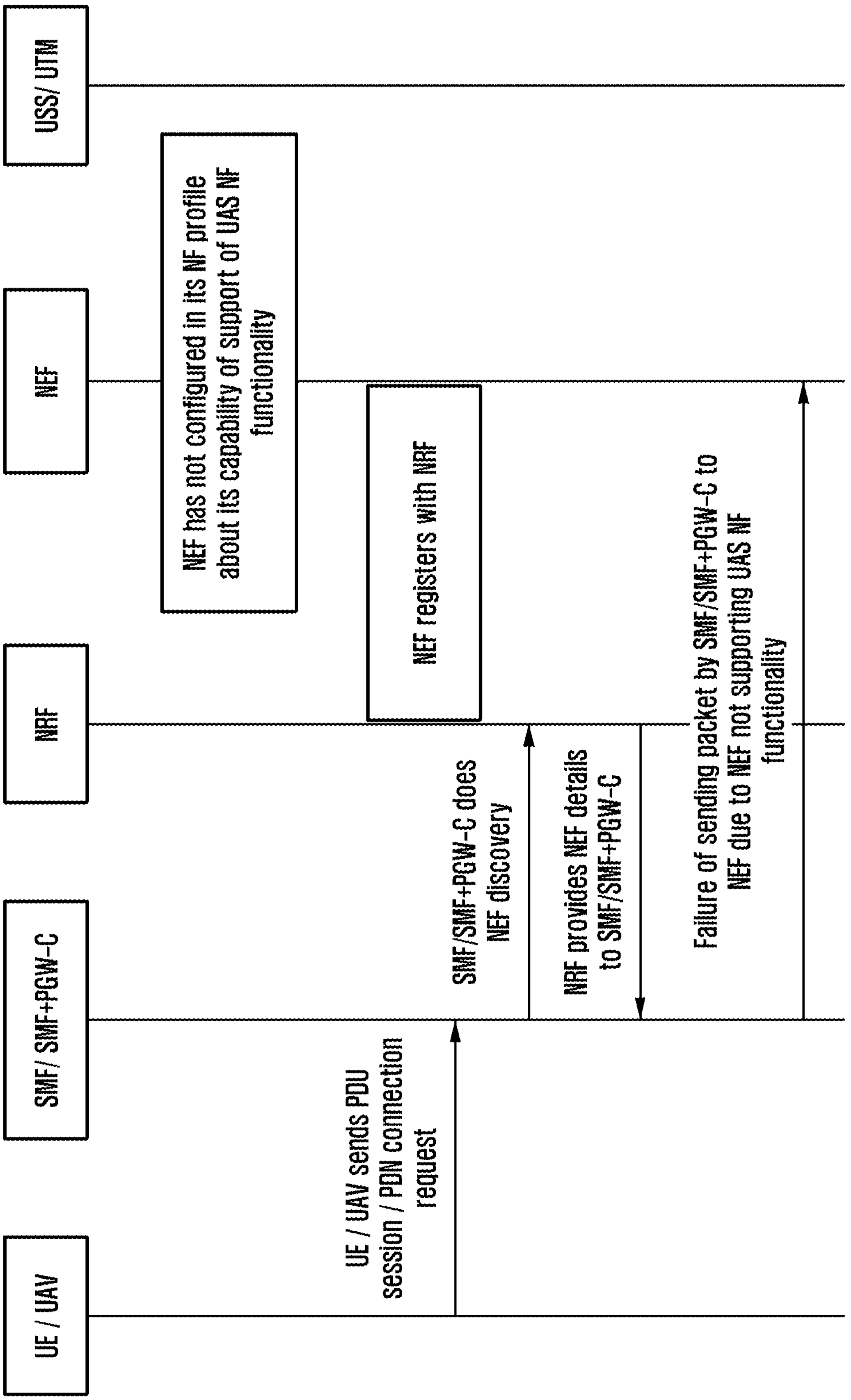
FIG. 2 is a representation of the problem scenario involving selection, by the SMF/SMF+PGW-C, of a NEF supporting UAS NF functionality, according to prior art.

FIG. 2 illustrates a problem in the scenario where the SMF/SMF+PGW-C is required to select a producer NF that supports UAS NF functionality. As previously mentioned in the scenario 1 problem, there may be a plurality of NEFs that are deployed by the network, and the plurality of NEFs may be registered in a NRF. Amongst this plurality of NEFs, there may be a few that support UAS NF functionality, however, none of the NEFs registered within the NRF may indicate in their NF profile about their ability to support UAS NF functionality. When the UAV sends a PDU session/PDN connection request to the SMF/SMF+PGW-C, the SMF/SMF+PGW-C may attempt to discover within the NRF for NEFs that support UAS NF functionality. However, since the NF profile of the NEFs within the NRF do not indicate whether the NEFs support UAS NF functionality, there may be a chance that the NRF provides the SMF/SMF+PGW-C with the details of a NEF that does not support UAS NF functionality. Therefore, if the SMF/SMF+PGW-C sends a packet to the selected NEF, there may be a failure in sending this packet if the selected NEF does not support UAS NF functionality, due to which the UAV's PDU session/PDN connection request may not be met. It is to be understood that support for UAS NF functionality can also mean support for exposure of services to USS/UTM.

Therefore, in order for a consumer NF, such as the AMF and/or SMF/SMF+PGW-C, to be able to successfully send a packet and complete a request from the UAV, the consumer NF may need to select the correct producer NF.

Figure 3:
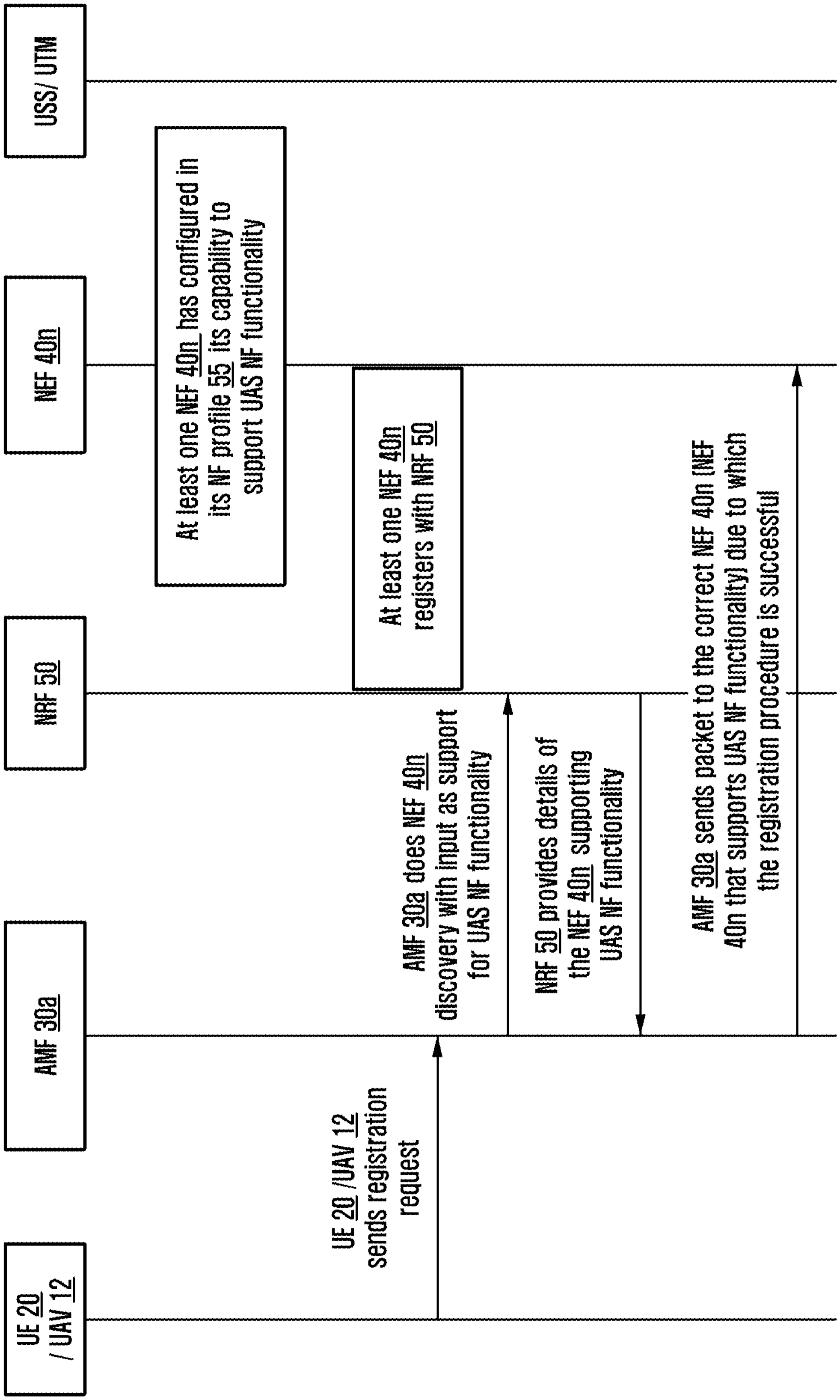
FIG. 3 is a representation of a solution to the problem scenario involving selection, by the AMF, of a NEF supporting UAS NF functionality, according to embodiments as disclosed herein.

Scenario 1 Solution: Selection of NEF Supporting UAS NF Functionality by the AMF FIG. 3 illustrates a solution to the problem scenario of selecting a NEF 40*n* that supports UAS NF functionality by the AMF 30*a*. Here, there may be at least one NEF 40*n* that is deployed, and among the at least one deployed NEF 40*n*, there may be at least one NEF 40*n* that supports UAS NF functionality. The at least one deployed NEF 40*n* may wish to register its NF profile 55 in the NRF 50 and may indicate in its respective NF profile 55 if it supports UAS NF functionality.

In such a situation, the at least one deployed NEF 40*n* may be regarded as a consumer NF as it is availing the registration service provided by the NRF 50 (an example of another NF). Consequently, as the NRF 50 is providing the registration service to the at least one deployed NEF 40*n* to register its profile in the NRF 50, the NRF 50 may be regarded as the producer NF in such a situation.

The NF profile 55 for each of the at least one deployed NEF 40*n* may have a support indicator ("uasNfFunctionalityInd") that is of a boolean data type. If the at least one deployed NEF 40*n* supports UAS NF functionality, the support indicator may have a value that is set to TRUE or 1. If the value is set to FALSE or 0, it may indicate that the at least one deployed NEF 40*n* does not support UAS NF functionality.

After the at least one deployed NEF 40*n* has registered its NF profile 55 in the NRF 50, the UAV 12 may send a registration request to the AMF 30*a*. Upon receiving the registration request, the AMF 30*a* may send a discovery request to the NRF 50.

As the AMF 30*a* is availing the discovery service provided by the NRF 50, in such a situation, the AMF 30*a* may be regarded as the consumer NF. Consequently, as the NRF 50 is providing the discovery service to the AMF 30*a*, the NRF 50 may be regarded as the producer NF. The Nnrf_NFDiscovery service can allow an AUNF 30 (an example of the AUNF 30 is AMF 30*a*) to discover services offered by a UNF 40 (an example of this is NEF 40*n* supporting UAS NF functionality). The Nnrf_NFDiscovery service may be executed by querying the "nf instances" resource in the NRF 50. If the NRF 50 is in the same Public Land Mobile Network (PLMN) as the AMF 30*a*, the AMF 30*a* may send a HTTP GET request to the resource uniform resource identifier (URI) "nf-instances" collection resource. If the AMF 30*a* is in a different PLMN than the NRF 50, then the AMF 30*a* may send a GET request to the NRF 50. This discovery request sent to the NRF 50 can include an input or a parameter that asks the NRF 50 to provide the AMF 30*a* with the details of only those deployed NEFs 40*n* that have indicated in their NF profile 55 about supporting UAS NF functionality. In response to the discovery request from the AMF 30*a*, the NRF 50 may provide the AMF 30*a* with the details or information of those deployed NEFs 40 that support UAS NF functionality. The AMF 30*a* may then select at least one of the NEF 40*n* whose details that the AMF 30*a* received from the NRF 50. The selection of at least one of the NEF 40*n*, whose details were received, may be random, or may be based on criteria such as, but not limited to, the load status of a specific ipv4/ipv6 address, a priority of the NEF 40*n*.

The AMF 30*a* may receive the address of the selected NEF 40*n* through its NF profile 55, and can then successfully send a packet to the selected NEF 40*n*, which can result in the completion of the UAV's 12 registration request (an example of this is a normal registration request). In this situation of the AMF 30*a* transmitting a message or a packet to the selected NEF 40*n*, the AMF 30*a* may be regarded as the consumer NF and the selected NEF 40*n* may be regarded as the producer NF, as the AMF 30*a* may be availing the authentication service provided by the selected NEF 40*n*. In other embodiments, a user equipment (UE) 20 may act as an equivalent to that of the UAV 12 by performing the same actions as that of the UAV 12 with regards to submitting a registration request to the AMF 30*a*.

While the disclosure of FIG. 3 has been made in the context of a NEF 40*n* supporting UAS NF functionality and the AMF 30*a* as availing the UAS NF service, this is not to be construed as limiting the scope of the embodiments disclosed herein. The NEF 40*n* that supports UAS NF functionality is just one example of a UNF 40 (NF supporting UAS NF functionality), and there may be other examples of UNF 40 that support UAS NF functionality and also indicate their support for UAS NF functionality in their registered NF profile 55. Similarly, the AMF 30*a* is just one example of an AUNF 30 (NF that avails the UAS NF functionality service), and so the scope of the embodiments disclosed herein should not be limited to being applicable to just AMF 30*a*.

Figure 4:
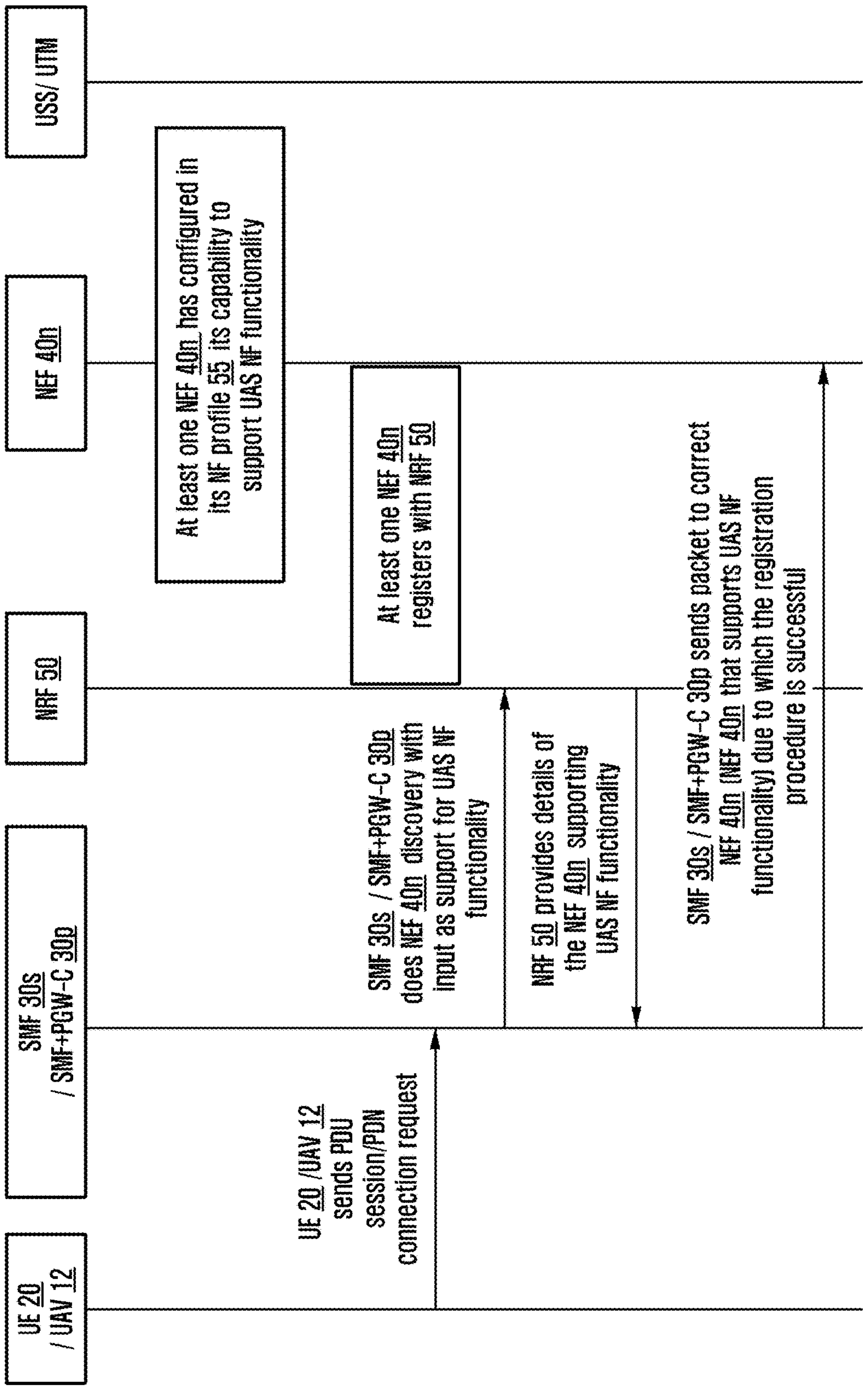
FIG. 4 is a representation of a solution to the problem scenario involving selection, by the SMF/SMF+PGW-C, of a NEF supporting UAS NF functionality, according to embodiments as disclosed herein.

Scenario 2 Solution: Selection of NEF Supporting UAS NF Functionality by the SMF/SMF+PGW-C FIG. 4 illustrates a solution to the problem scenario where the SMF/SMF+PGW-C 30 is required to select a NEF 40*n* that supports UAS NF functionality. The at least one NEF 40*n* that are deployed by the network and registered in the NRF 50 may indicate in their respective NF profile 55 about their support for UAS NF functionality.

The NRF 50 may store the NF profile 55 of the at least one NEF 40*n* registered in the NRF 50. In the situation where the at least one NEF 40*n* registers its profile 55 in the NRF 50, the at least one NEF 40*n* may be considered as the consumer NF as it is availing the registration service offered by the NRF 50. Similarly, in this situation, the NRF 50 may be considered as the producer NF as it is providing the registration service to the at least one NEF 40*n*.

The UAV 12 may send a PDU session/PDN connection request to the SMF 30*s*/SMF+PGW-C 30*p*, upon which the SMF 30*s*/SMF+PGW-C 30*p* may send a discovery request to the NRF 50. This discovery request can include an input on parameter that asks the NRF 50 to provide the SMF 30*s*/SMF+PGW-C 30*p* with the details of only those NEFs 40*n* that have indicated in their NF profile 55 about supporting UAS NF functionality. In this situation, the SMF 30*s*/SMF+PGW-C 30*p* may be considered as the consumer NF, as it is availing the discovery service provided by the NRF 50. Similarly, in this situation, the NRF 50 may be considered as the producer NF as it is providing the discovery service to the SMF 30*s*/SMF+PGW-C 30*p* for discovering one or more NEF, among the at least one deployed NEF 40*n*, that supports UAS NF functionality.

Upon receiving from the NRF 50 the details of those NEFs 40*n* that support UAS NF functionality, the SMF 30*s*/SMF+PGW-C 30*p* may select at least one of those NEFs 40*n*. The selected NEF 40*n* may support UAS NF functionality.

The SMF 30*s*/SMF+PGW-C 30*p* may then successfully send a packet to the selected NEF 40*n*, which can result in the completion of the UAV 12's PDU session/PDN connection request. In this situation where the SMF 30*s*/SMF+PGW-C 30*p* is sending a packet to the selected NEF 40*n*, the SMF 30*s*/SMF+PGW-C 30*p* may be considered as the consumer NF, and the selected NEF 40*n* may be considered as the producer NF, as the SMF 30*s*/SMF+PGW-C 30*p* is availing the authentication service provided by the selected NEF 40*n*. In other embodiments, a UE 20 may act as an equivalent to that of the UAV 12 by performing the same actions as that of the UAV 12.

While the disclosure of FIG. 4 has been made in the context of NEF 40*n* supporting UAS functionality and the SMF 30*s*/SMF+PGW-C 30*p* as availing the UAS NF service, this is not to be construed as limiting the scope of the embodiments disclosed herein. The NEF 40*n* that supports UAS NF functionality is just one example of a UNF 40 (NF supporting UAS NF functionality), as there may be other NFs that support UAS NF functionality, and as such, the scope of the embodiments disclosed herein extends to such NFs as well. Similarly, the SMF 30*s*/SMF+PGC-C 30*p* is just one example of an AUNF 30 (NF that avails UAS NF service), and the scope of the embodiments disclosed herein extends to any other examples of AUNF 30 as well.

FIG. 5 illustrates a method 500 for selecting a UNF 40 (NF supporting UAS NF functionality) by an AUNF 30, according to embodiments as disclosed herein.

At step 502, at least one of the deployed NFs may indicate their support for UAS NF functionality. The at least one deployed NF supporting UAS NF functionality may provide such an indication through their respective NF profile 55.

At step 504, at least one of the deployed NFs supporting UAS NF functionality, may register itself in a NRF 50. The NRF 50 can store the NF profiles 55 of the at least one deployed NF that is registered in the NRF 50.

At step 506, an AUNF 30 may send a discovery request to the NRF 50, with the discovery request requiring the NRF 50 to provide the AUNF 30 with the details of at least one deployed NF in the NRF 50 that have indicated that they support UAS NF functionality.

At step 508, the AUNF 30 may receive from the NRF 50 the details of the at least one deployed NF that supports UAS NF functionality.

At step 510, the AUNF 30 selects the at least one deployed NF that supports UAS NF functionality.

The various actions in method 500 may be performed in the order presented, in a different order or simultaneously. Further, in some embodiments, some actions listed in FIG. 5 may be omitted.

FIG. 6 illustrates a system 100 that facilitates the selection of a UNF 40 by an AUNF 30. A UAS 10 may comprise of a UAV 12 and a ground-based controller 14. The UAV 12 may transmit to the AUNF 30 one or more requests that can result in a certain procedure being performed. Examples of the one or more requests can be a registration request and/or a PDU session/PDN connection request. A UE 20 may also be configured to also transmit one or more requests to the AUNF 30, with examples of the one or more requests being a registration request and/or a PDU session/PDN connection request.

The AUNF 30, examples of which are the AMF 30*a*, SMF 30*s*, and SMF+PGW-C 30*p*, may be able to send a discovery request to the NRF 50, with the discovery request including a parameter or requiring the NRF 50 to provide the AUNF 30 with details of at least one UNF 40 (NF that supports UAS NF functionality) in the NRF 50. The AUNF 30 may also send a packet to the at least one UNF 40, which can lead to the performance of a procedure.

There may be at least one NF deployed by the network. Among the NFs deployed, there may be at least one NF that supports UAS NF functionality (UNF 40). Each deployed NF may register itself in a NRF 50, and may indicate in its NF profile 55 about its support for UAS NF functionality. The UNF 40 may indicate in its respective NF profile 55 that it supports UAS NF functionality by having a TRUE value assigned to its support indicator. Among the at least one NF deployed, there may also be at least one NEF 40*n* that may also support UAS NF functionality.

The NRF 50 may store the NF profiles 55 of the deployed NFs (including the UNFs 40 and NEF 40*n*) that are registered in the NRF 50, and may then provide the AUNF 30 with details of those NFs in the NRF 50 that support UAS NF functionality based on the AUNF's 30 discovery request. If the deployed NF is NEF 40*n*, it may indicate its support for UAS NF functionality. Examples of the details or information stored in the NF profile 55 can include one or more addresses, such as, but not limited to, a fully qualified domain name (FQDN), an Internet Protocol (IP) address, and an endpoint address.

It is to be understood that there may be other means of indicating by the deployed NF regarding its support for UAS NF functionality, and that indicating in the NF profile 55 of the deployed NF about its UAS NF functionality may just be one among many methods of doing so, and therefore this should not be construed as limiting the scope of the embodiments as disclosed herein. It is also to be understood that examples of the AUNF 30 are not limited to the AMF and the SMF/SMF+PGW-C. It is also to be noted that the UNF 40 may interchangeably refer to "a NF that supports UAS NF functionality," "a producer NF that supports UAS NF functionality," and "a deployed NF that supports UAS NF functionality." It is also to be noted that the AUNF 30 may interchangeably refer to "a NF that is availing UAS NF functionality service" or "a consumer NF that is availing UAS NF functionality service."

In the embodiments disclosed herein, the discovery request from the AUNF 30 to the NRF 50 can include the parameter "support of exposure of services towards USS/UTM," which can indicate whether deployed NF supports the UAS service specific features and/or application programming interfaces (APIs) towards the USS.

The embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

The invention claimed is:

1. A method performed by a consumer network function (NF) for managing an unmanned aerial system (UAS), comprising:

transmitting, to a network repository function (NRF), a discovery request for at least one network exposure function (NEF), wherein the discovery request includes information associated with support of UAS NF functionality;

receiving, from the NRF, information on the at least one NEF based on the information associated with the support of the UAS NF functionality; and selecting an NEF among, the at least one NEF, wherein the NEF supports the UAS NF functionality.

2. The method of claim 1, wherein the information on the at least one NEF comprises an NF profile.

3. The method of claim 1, wherein the information on the at least one NEF is registered. by the at least one NEF, in the NRF.

4. The method of claim 1, wherein the information on the at least one NEF includes information indicating that the at least one NEF supports the UAS NF functionality.

5. The method of claim 1, wherein the information on the at least one NEF includes at least one of an Internet Protocol (IP) address, a fully qualified domain name (FQDN), or an endpoint address for the at least one NEF.

6. A method performed by a network repository function (NRF) for managing an unmanned aerial system (UAS), comprising:

receiving, from a network exposure function (NEF), information on the NEF;

registering the information on the NEF in the NRF;

receiving, from a consumer network function (NF), a discovery request for at least one NEF, wherein the discovery request includes information associated with support of UAS NF functionality; and transmitting, to the consumer NF, information on the at least one NEF based on the information associated with the support of the UAS NF functionality.

7. The method of claim 6, wherein the information on the NEF comprises an NF profile including at least one of an internet protocol (IP) address, a fully qualified domain name (FQDN), or an endpoint address for the NEF, and wherein the information on the NEF includes information indicating that the at least one NEF supports the UAS NF functionality.

8. A consumer network function (NF) for managing an unmanned aerial system (UAS), the consumer NF comprising:

at least one transceiver; and at least one processor coupled to the at least one transceiver, the at least one processor configured to:

transmit, to a network repository function (NRF), a discovery request for at least one network exposure function (NEF), wherein the discovery request includes information associated with support of UAS NF functionality, receive, from the NRF, information on the at least one NEF based on the information associated with the support of the UAS NF functionality, and select an NEF among the at least one NEF, wherein the NEF supports the UAS NF functionality.

9. The consumer NF of claim 8, wherein the information on the at least one NEF comprises an NF profile.

10. The consumer NF of claim 8, wherein the information on the at least one NEF is registered, by the at least one NEF, in the NRF.

11. The consumer NF of claim 8, wherein the information on the at least one NEF includes information indicating that the at least one NEF supports the UAS NF functionality.

12. The consumer NF of claim 8, wherein the information on the at least one NEF includes at least one of an internet protocol (IP) address, a fully qualified domain name (FQDN), or an endpoint address for the at least one NEF.

13. A network repository function (NRF) for managing an unmanned aerial system (UAS), the NRF comprising:

at least one transceiver; and at least one processor coupled to the at least one transceiver, the at least one processor configured to:

receive, from a network exposure function (NEF), information on the NEF, register the information on the NEF in the NRF, receive, from a consumer network function (NF), a discovery request for at least one NEF, wherein the discovery request includes information associated with support of UAS NF functionality, and transmit, to the consumer NF, information on the at least one NEF based on the information associated with the support of the UAS NF functionality.

14. The NRF of claim 13, wherein the information on the NEF comprises an NF profile including at least one of an internet protocol (IP) address, a fully qualified domain name (FQDN), or an endpoint address for the NEF.

15. The NRF of claim 13, wherein the information on the NEF includes information indicating that the at least one NEF supports the UAS NF functionality.

* * * * *